(12) United States Patent
Jang et al.

(10) Patent No.: US 12,171,027 B2
(45) Date of Patent: *Dec. 17, 2024

(54) METHOD AND APPARATUS FOR PERFORMING RANDOM ACCESS IN WIRELESS COMMUNICATION SYSTEM

(71) Applicant: Samsung Electronics Co., Ltd., Suwon-si (KR)

(72) Inventors: Jaehyuk Jang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,546

(22) Filed: Feb. 16, 2021

(65) Prior Publication Data
US 2021/0168878 A1 Jun. 3, 2021

Related U.S. Application Data

(63) Continuation of application No. 16/368,140, filed on Mar. 28, 2019, now Pat. No. 10,966,254.

(30) Foreign Application Priority Data

Mar. 28, 2018 (KR) .......................... 10-2018-0036025

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0098* (2013.01); *H04W 36/04* (2013.01);
(Continued)

(58) Field of Classification Search
None
See application file for complete search history.

(56) References Cited

U.S. PATENT DOCUMENTS 10,966,254 B2 * 3/2021 Jang ...................... H04W 76/27
11,057,940 B2 * 7/2021 Agiwal ................. H04W 48/18
(Continued)

FOREIGN PATENT DOCUMENTS

| CN | 103460634 A | 12/2013 |
|---|---|---|
| CN | 107396386 A | 11/2017 |

(Continued)

OTHER PUBLICATIONS

Babaei, provisional U.S. Appl. No. 62/630,436, filed Feb. 2018 (Year: 2018).*

(Continued)

*Primary Examiner* — Jay L Vogel
(74) *Attorney, Agent, or Firm* — Jefferson IP Law, LLP

(57) ABSTRACT

A method, by a terminal, of performing a random access in a wireless communication system is provided. The method includes identifying a random access occasion configured for an active uplink (UL) bandwidth part (BWP) of a serving cell and when the serving cell is a special cell (SpCell) and an identity (ID) of an active downlink (DL) BWP does not correspond to an ID of the active UL BWP, switching the active DL BWP to a DL BWP with ID corresponding to the ID of the active UL BWP, based on BWP configuration information for the serving cell, and performing a random access on the switched DL BWP.

16 Claims, 11 Drawing Sheets

(51) Int. Cl.
| | | |
|---|---|---|
| *H04W 36/00* | (2009.01) | |
| *H04W 36/04* | (2009.01) | |
| *H04W 36/06* | (2009.01) | |
| *H04W 72/0453* | (2023.01) | |
| *H04W 72/20* | (2023.01) | |
| *H04W 72/23* | (2023.01) | |
| *H04W 72/50* | (2023.01) | |
| *H04W 74/00* | (2009.01) | |
| *H04W 74/0833* | (2024.01) | |
| *H04W 76/27* | (2018.01) | |

(52) U.S. Cl.
CPC ........... *H04W 36/06* (2013.01); *H04W 72/20* (2023.01); *H04W 72/23* (2023.01); *H04W 72/535* (2023.01); *H04W 74/002* (2013.01); *H04W 74/006* (2013.01); *H04W 76/27* (2018.02); *H04W 36/0069* (2018.08); *H04W 72/0453* (2013.01)

(56) References Cited

U.S. PATENT DOCUMENTS

| | | |
|---|---|---|
| 2012/0275305 A1 | 11/2012 | Lin |
| 2013/0028182 A1 | 1/2013 | Geirhofer et al. |
| 2016/0330768 A1 | 11/2016 | Hu et al. |
| 2017/0250787 A1 | 8/2017 | Geirhofer et al. |
| 2018/0048413 A1 | 2/2018 | Liu et al. |
| 2018/0049068 A1 | 2/2018 | Agiwal et al. |
| 2018/0054837 A1 | 2/2018 | Islam et al. |
| 2019/0149308 A1* | 5/2019 | Son ..................... H04L 5/0007 375/260 |
| 2019/0149380 A1 | 5/2019 | Babaei et al. |
| 2019/0215869 A1* | 7/2019 | Lin ..................... H04L 5/001 |
| 2019/0215870 A1* | 7/2019 | Babaei ................. H04W 24/10 |
| 2019/0254114 A1* | 8/2019 | Son ..................... H04W 76/11 |
| 2022/0393816 A1* | 12/2022 | Yi ........................ H04L 5/0094 |

FOREIGN PATENT DOCUMENTS

| | | |
|---|---|---|
| CN | 107493605 A | 12/2017 |
| KR | 10-2018-0016301 A | 2/2018 |
| WO | 2018/030711 A1 | 2/2018 |
| WO | 2020/067951 A1 | 4/2020 |

OTHER PUBLICATIONS

TSG-RAN2 #101 R2-1801815) (Year: 2018).*
U.S. Appl. No. 62/631,264, filed Feb. 15, 2018 (Year: 2018).*
U.S. Appl. No. 62/629,702, filed Feb. 13, 2018 (Year: 2018).*
U.S. Appl. No. 62/585,526, filed Nov. 13, 2017 (Year: 2017).*
Chinese Office Action dated Aug. 5, 2021, issued in Chinese Application No. 201980023015.0.
European Office Action dated Sep. 17, 2021, issued in European Application No. 19777571.1.
3GPP TSG-RAN WG2 NR 2018AH#1 Meeting Samsung—Corrections for BWP switching—R2-1801467—XP 51386874. Vancouver, Canada, Jan. 22-26, 2018.
3GPP TSG-RAN WG2 Meeting #101, MediaTek Inc.—BWP ambiguilty for contention-based RACH procedure—R2-1803061—XP 51400367. Athens, Greece, Feb. 26-Mar. 2, 2018.
GPP TSG-RAN WG2 Meeting #101—Nokia, Nokia Shanghai Bell, BWP switch interaction with contention free BFR preamble—R2-1803229—XP 51400430. Athens, Greece, Feb. 26-Mar. 2, 2018.
3PP TSG-RAN WG2 AH-1807—CATT—Further issues with DL BWP switching for CFRA—R2-1809515—XP 51466800 Montreal, Canada, Jul. 2-6, 2018.
European Search Report dated Jan. 28, 2021, issued in European Application No. 19777571.1-1215 / 3750369.
3GPP; 3rd Generation Partnership Project; Technical Specification Group Radio Access Network; NR; Medium Access Control (MAC) protocol specification (Release 15); 3GPP TS 38.321; V15.0.0; Dec. 2017.
Oppo et al.; Prevent BWP switching for PDSCH/PUSCH transmission; 3GPP TSG-RAN2 #101; R2-1801761 Feb. 26-Mar. 2, 2018; Athens, Greece.
Huawei et al.; Further considerations on RACH related BWP issues; 3GPP TSG-RAN2 #101; R2-1801815; Feb. 26-Mar. 2, 2018; Athens, Greece.
Zte Corporation et al.; Discussion on the configuration of initial BWP/first BWP on Scell; 3GPP TSG-RAN WG2 Meeting #101; R2-1802017; Feb. 26-Mar. 2, 2018; Athens, Greece.
International Search Report with Written Opinion dated Jul. 2, 2019; International Appln. No. PCT/KR2019/003665.
U.S. Appl. No. 62/631,264, filed Feb. 15, 2018, Lin (Year: 2018).
U.S. Appl. No. 62/629,702, filed Feb. 13, 2018, Son (Year: 2018).
Samsung (Rapporteur) et al., R2-1802433, "General corrections on TS 38.321", 3GPP TSG RAN WG2 #101, 3GPP (Feb. 14, 2018.).
Korean Office Action dated Mar. 22, 2022, issued in Korean Application No. 10-2018-0036025.
European Office Action dated Mar. 16, 2022, issued in European Application No. 19777571.1.
Ericsson (Rapporteur), R2-1803871, Summary of BWP linkage for Random Access, 3GPP TSG RAN WG2 #101, 3GPP (Mar. 2, 2018.).
Korean Office Action dated Sep. 21, 2022, issued in Korean Application No. 10-2018-0036025.
Indian Office Action dated Jul. 22, 2022, issued in Indian Application No. 202037042313.
European Notice of Allowance dated Oct. 11, 2022, issued in European Application No. 19777571.1.
European Search Report dated Apr. 21, 2023, issued in European Application No. 23157822.0.
European Communication under Rule 71(3) EPC dated Dec. 19, 2023; European Appln. No. 23 157 822.0-1215.
European Communication under Rule 71(3) EPC dated Apr. 29, 2024; European Appln. No. 23 157 822.0-1215.
Japanese Office Action dated Jan. 31, 2023, issued in Japanese Application No. 2020-551830.
Korean Decision to Refuse dated Mar. 17, 2023, issued in Korean Application No. 10-2018-0036025.
Chinese Office Action with English translation dated Oct. 21, 2024; Chinese Appln. No. 202210355460.0.

* cited by examiner

METHOD AND APPARATUS FOR PERFORMING RANDOM ACCESS IN WIRELESS COMMUNICATION SYSTEM

CROSS-REFERENCE TO RELATED APPLICATION(S)

This application is a continuation application of prior application Ser. No. 16/368,140, filed on Mar. 28, 2019, and was based on and claimed priority under 35 U.S.C. § 119(a) of a Korean patent application number 10-2018-0036025, filed on Mar. 28, 2018, in the Korean Intellectual Property Office, the disclosure of which is incorporated by reference herein in its entirety.

BACKGROUND

1. Field

The disclosure relates to a wireless communication system. More particularly, the disclosure relates to a method of performing random access in a wireless communication system.

2. Description of Related Art

To meet the increase in demand with respect to wireless data traffic after the commercialization of fourth generation (4G) communication systems, considerable efforts have been made to develop improved fifth generation (5G) communication systems or pre-5G communication systems. This is one reason why '5G communication systems' or 'pre-5G communication systems' are called 'beyond 4G network communication systems', 'post long term evolution (LTE) systems', or 'next generation mobile communication systems'. In order to achieve a high data rate, 5G communication systems are being developed to be implemented in a super-high frequency band (millimeter wave (mmWave)), e.g., a band of 60 GHz. In order to reduce path loss in such a super-high frequency band and to increase a propagation distance of electric waves in 5G communication systems, various technologies such as beamforming, massive multiple input multiple output (massive MIMO), full dimensional MIMO (FD-MIMO), array antennas, analog beamforming, and large scale antennas are being studied. In order to improve system networks for 5G communication systems, various technologies such as evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency shift keying (FSK) and quadrature amplitude modulation (QAM) (FQAM) and sliding window superposition coding (SWSC) and advanced access technologies such as filter bank multi-carrier (FBMC), non-orthogonal multiple access (NOMA), and sparse code multiple access (SCMA) have been developed.

With regard to other aspects, the Internet has evolved from a human-based connection network, where humans create and consume information, to the Internet of things (IoT), where distributed elements such as objects exchange information with each other to process the information. Internet of everything (IoE) technology, in which the IoT technology is combined with, for example, technology for processing big data through connection with a cloud server, is being newly provided. In order to implement the IoT, various technological elements such as a sensing technology, wired/wireless communication and network infrastructures, a service interface technology, and a security technology are required. In recent years, technologies related to sensor networks for connecting objects, machine-to-machine (M2M) communication, and machine type communication (MTC) have been studied. In the IoT environment, intelligent Internet technology (IT) services may be provided to collect and analyze data obtained from connected objects and thus to create new values in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, MTC, etc. are implemented by using 5G communication technology including beamforming, MIMO, array antennas, etc. Application of a cloud RAN as the above-described big data processing technology may be an example of convergence of the 5G communication technology and the IoT technology.

As described above, with the development of wireless communication systems, various services are now providable, and thus, a way of smoothly providing these services is required.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a method of performing random access in a primary cell (PCell) or a secondary cell (SCell) when using a frequency merging technique that uses a part of bandwidth.

Another aspect of the disclosure is to provide a method of differentially applying a method for succeeding in random access according to a type of random access being performed.

Additional aspects will be set forth in part in the description which follows and, in part, will be apparent from the description, or may be learned by practice of the presented embodiments.

In accordance with an aspect of the disclosure, a method, performed by a terminal, of performing a random access in a wireless communication system is provided. The method includes identifying a random access occasion configured for an active uplink (UL) bandwidth part (BWP) of a serving cell and when the serving cell is a special cell (SpCell) and an identity (ID) of an active downlink (DL) BWP does not correspond to an ID of the active UL BWP, switching the active DL BWP to a DL BWP with ID corresponding to the ID of the active UL BWP, based on BWP configuration information for the serving cell, and performing a random access on the switched DL BWP.

The BWP configuration information may include the ID of the active DL BWP and the ID of the active UL BWP.

When the serving cell is an SCell, the random access may be initiated based on a physical downlink control channel (PDCCH) with a random access preamble index.

The random access may include a contention-based random access.

In accordance with another aspect of the disclosure, a method, performed by a base station, of performing a random access in a wireless communication system is provided. The method includes transmitting a radio resource control (RRC) message including BWP configuration information regarding an active downlink (DL) BWP and an active UL BWP for a serving cell and performing a random access based on the BWP configuration information, wherein when the serving cell is an SpCell and an identity (ID) of an active downlink (DL) BWP does not correspond to an ID of the active UL BWP, the active DL BWP is switched to a DL BWP with ID corresponding to the ID of the active UL BWP.

The method may further include transmitting a physical downlink control channel (PDCCH) with a random access preamble index, wherein, when the serving cell is an SCell, the random access may be initiated based on the PDCCH.

In accordance yet another aspect of the disclosure, a terminal for performing a random access in a wireless communication system is provided. The terminal includes a transceiver and at least one processor coupled with the transceiver and configured to identify a random access occasion configured for an active UL BWP of a serving cell, and when the serving cell is an SpCell and an identity (ID) of an active downlink (DL) BWP does not correspond to an ID of the active UL BWP, switch the active DL BWP to a DL BWP with ID corresponding to the ID of the active UL BWP, based on BWP configuration information for the serving cell, and perform a random access on the switched DL BWP.

In accordance with yet another aspect of the disclosure, a base station for performing a random access in a wireless communication system is provided. The base station includes a transceiver and at least one processor coupled with the transceiver and configured to transmit a radio resource control (RRC) message including BWP configuration information regarding an active downlink (DL) BWP and an active UL BWP for a serving cell and performing a random access based on the BWP configuration information, wherein, when the serving cell is an SpCell and an identity (ID) of an active downlink (DL) BWP does not correspond to an ID of the active UL BWP, the active DL BWP is switched to a DL BWP with ID corresponding to the ID of the active UL BWP.

The processor may be further configured to transmit a physical downlink control channel (PDCCH) with a random access preamble index, wherein, when the serving cell is an SCell, the random access may be initiated based on the PDCCH.

According to another embodiment of the disclosure, a computer-readable recording medium on which a program for executing the method is recorded.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following descriptions, a term used for identifying an access node, a term referring to a network entity, a term referring to messages, a term indicating an interface between network entities, a term indicating various pieces of identification information, or the like, are provided merely for convenience of description. Therefore, the disclosure is not limited to the following terms, and other terms referring to objects having equivalent technical meanings may be used.

For convenience of description, the disclosure uses terms and names defined in the $3^{rd}$ generation partnership project long term evolution (3GPP LTE) standard or uses modified terms and names based on the terms and names. However, the disclosure is not limited to the terms and the names and may be equally applied to systems conforming to other standards. In particular, one or more embodiments of the disclosure may be applied to 3GPP new radio (NR) ($5^{th}$ generation mobile communication standard).

Throughout the disclosure, the expression "at least one of a, b or c" indicates only a, only b, only c, both a and b, both a and c, both b and c, all of a, b, and c, or variations thereof.

Figure 1A:
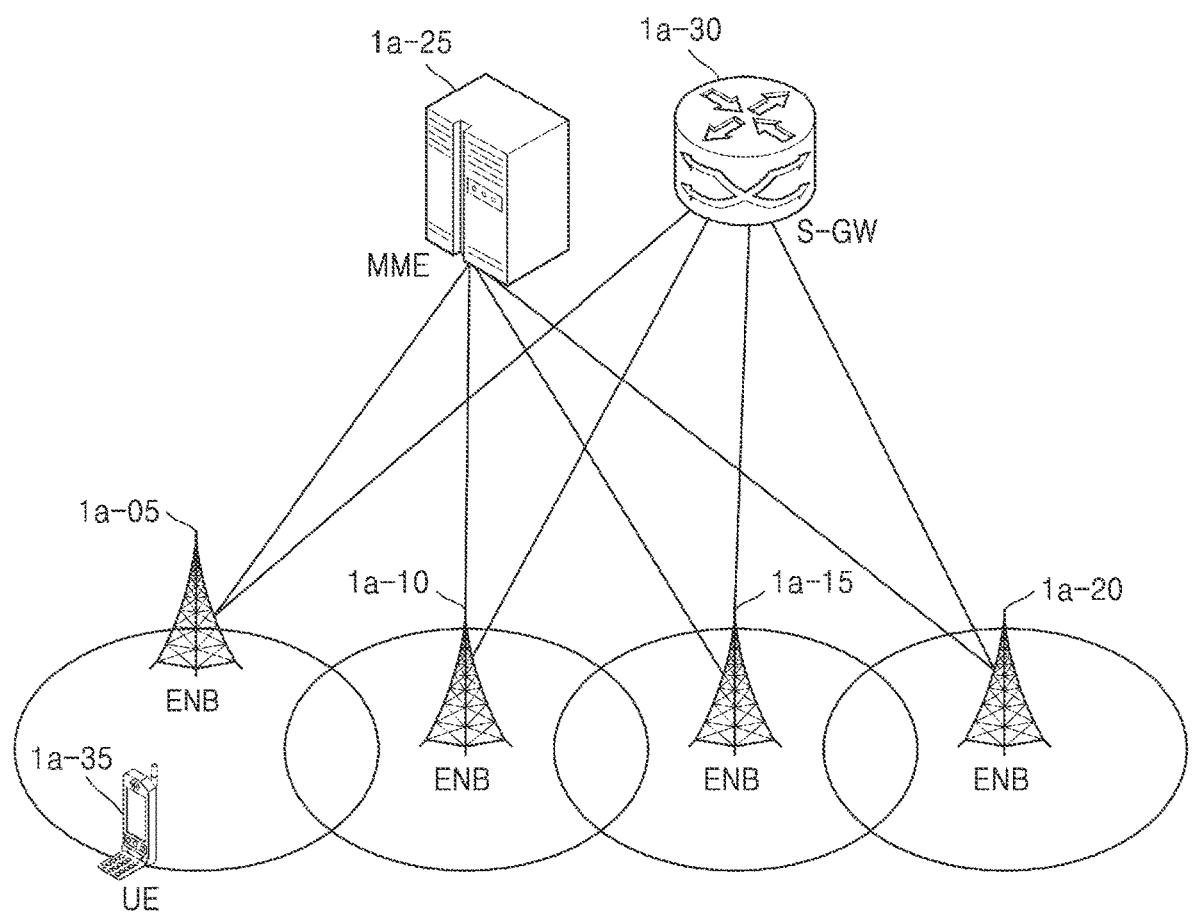
FIG. 1A is a diagram of a structure of a long-term evolution (LTE) system referred to for the purpose of describing an embodiment of the disclosure.

FIG. 1A is a diagram of a structure of an LTE system referred to for the purpose of describing an embodiment of the disclosure. An NR system has practically the same structure as the LTE system.

Referring to FIG. 1A, a wireless communication system may include a plurality of evolved universal terrestrial radio access network (E-UTRAN) nodes B (eNBs) 1a-05, 1a-10, 1a-15, and 1a-20, a mobility management entity (MME) 1a-25 and a serving-gateway (S-GW) 1a-30. A user equipment (UE) 1a-35 may be connected to an external network via the eNBs 1a-05 through 1a-20 and the S-GW 1a-30.

The eNBs 1a-05 through 1a-20 may provide wireless connection to UEs accessing a network, as access nodes of a cellular network. That is, the eNBs 1a-05 through 1a-20 may support connection between the UEs and a core network (CN) via scheduling by collecting status information, such as buffer statuses, available transmission power statuses, and channel statuses, of the UEs to service user traffic. The MME 1a-25 is a device in charge of various control functions in addition to a mobility management function of the UE and is connected to a plurality of base stations, and the S-GW 1a-30 is a device functioning as a data bearer. Also, the MME 1a-25 and the S-GW 1a-30 may perform authentication, bearer management, or the like, on the UE connecting to a network, and process packets received from the eNBs 1a-05 through 1a-20 or packets to be transmitted to the eNBs 1a-05 through 1a-20.

Figure 1B:
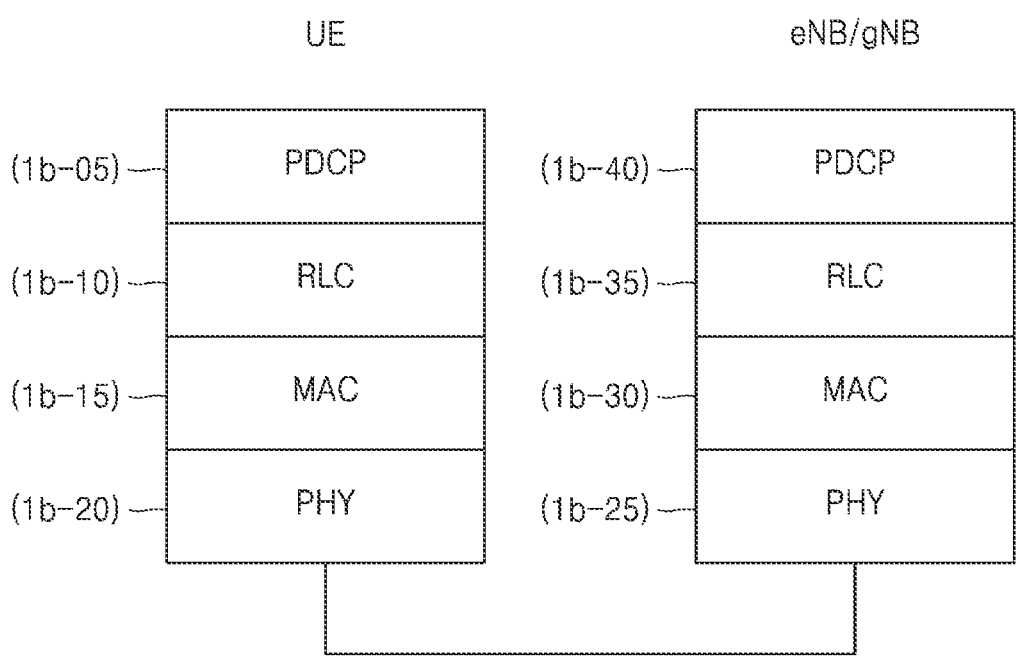
FIG. 1B is a diagram of a radio protocol architecture in LTE and new radio (NR) systems referred to for the purpose of describing an embodiment of the disclosure.

FIG. 1B is a diagram of a radio protocol architecture in LTE and NR systems referred to for the purpose of describing an embodiment of the disclosure.

Referring to FIG. 1B, a radio protocol of the LTE system may include packet data convergence protocols (PDCPs) 1b-05 and 1b-40, radio link controls (RLCs) 1b-10 and 1b-35, medium access controls (MACs) 1b-15 and 1b-30, and physical entities (PHY) 1b-20 and 1b-25, in a respective UE and eNB/gNB. The PDCPs 1b-05 and 1b-40 may perform operations including internet protocol (IP) header compression/decompression, etc., and the RLCs 1b-10 and 1b-35 may reconfigure a PDCP packet data unit (PDU) to have an appropriate size. The MACs 1b-15 and 1b-30 are connected to a plurality of RLC entities configured in one UE, and may perform operations of multiplexing RLC PDUs into MAC PDUs and demultiplexing RLC PDUs from MAC PDUs. The PHY 1b-20 and 1b-25 may perform operations of channel-encoding and modulating upper entity data and transmitting orthogonal frequency division multiplexing (OFDM) symbols through a wireless channel by converting the upper entity data to the OFDM symbols, or operations of demodulating and channel-decoding OFDM symbols received through the wireless channel and transmitting decoded data to an upper entity. To perform additional error correction, the PHY 1b-20 and 1b-25 use hybrid automatic repeat request (HARQ), and a receiver may transmit 1 bit indicating acknowledgement (ACK) or negative acknowledgement (NACK) about a packet transmitted from a transmitter. This is called HARQ ACK/NACK information. Downlink (DL) HARQ ACK/NACK information with respect to uplink (UL) data transmission may be transmitted via a physical HARQ indicator channel (PHICH) physical channel in LTE. In NR, whether a packet to be retransmitted or newly transmitted may be determined via scheduling information of the UE from a physical dedicated control channel (PDCCH) that is a channel through which DL/UL resource assignment or the like is transmitted. This is because asynchronous HARQ is applied in NR. UL HARQ ACK/NACK information with respect to DL data transmission may be transmitted via a physical uplink control channel (PUCCH) physical channel or a physical uplink shared channel (PUSCH) physical channel. PUCCH is generally transmitted in a UL of a primary cell (PCell) described later, but when supported by the UE, PUCCH may be transmitted in a UL of a secondary cell (SCell) described later, and such an SCell may be referred to as a PUCCH SCell.

Although not illustrated in FIG. 1B, respective Radio Resource Control (RRC) entities are present as upper entities of the PDCP entities 1b-05 and 1b-40 of the UE and the eNB, and the RRC entities may exchange a setting control message related to access and measurement for controlling wireless resources.

The PHY 1b-20 or 1b-25 may include one or more frequencies/carriers, and a technology for simultaneously setting and using multiple frequencies is called carrier aggregation (CA) technology. According to the CA technology, instead of using only one carrier for communication between a UE and a base station (i.e., eNB), one primary carrier and a plurality of secondary carriers are additionally used and thus transmission capacity may be significantly increased by the number of secondary carriers. In LTE, a cell served by a base station using the primary carrier is called a PCell and a cell served by the base station using the secondary carrier is called an SCell.

Figure 1C:
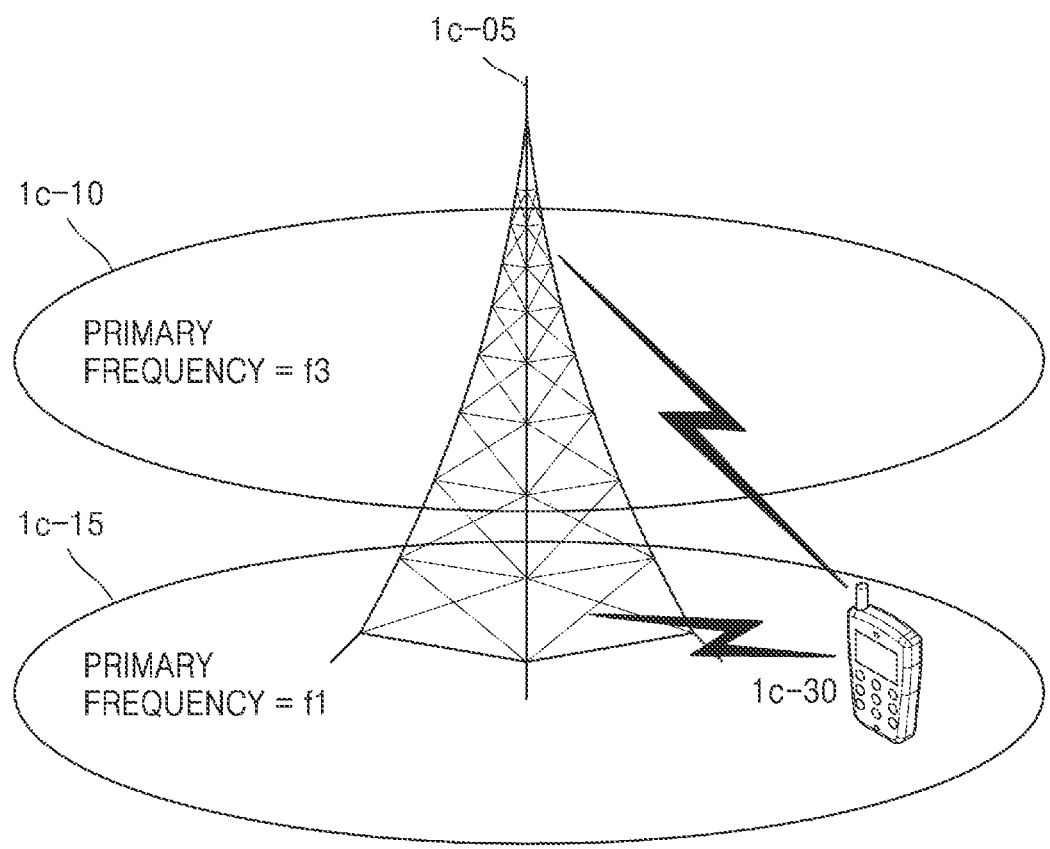
FIG. 1C is a diagram for describing carrier aggregation (CA) technology according to an embodiment of the disclosure.

FIG. 1C is a diagram for describing CA technology according to an embodiment of the disclosure.

Referring to FIG. 1C, in one base station, a plurality of carriers may be generally transmitted and received over several frequency bands. For example, when a base station 1c-05 transmits a carrier 1c-15 whose primary frequency is f1 and a carrier 1c-10 whose primary frequency is f3, according to the related art, one UE transmits and receives data by using one of two carriers. However, a UE having a CA function may simultaneously transmit and receive data with a plurality of carriers. The base station 1c-05 may assign more carriers to a UE 1c-30 having a CA function, according to circumstances, thereby increasing a transmission rate of the UE 1c-30.

When it is assumed that one cell generally consists of one forward carrier and one backward carrier which are transmitted and received from and by one base station, CA may be understood in a manner that a UE simultaneously transmits and receives data through multiple cells. By doing so, a maximum transmission rate may be increased in proportion to the number of aggregated carriers.

Hereinafter, in embodiments of the disclosure, the expression that a UE receives data through a random forward carrier or transmits data through a random backward carrier has the same meaning as the data being transmitted and received by using a control channel and a data channel provided by a cell corresponding to a primary frequency and a frequency bandwidth which specify a corresponding carrier. Also, hereinafter, one or more embodiments of the disclosure will be described with reference to an LTE system for convenience of description, but the one or more embodiments of the disclosure may be applied to various wireless communication systems that support CA.

Figure 1D:
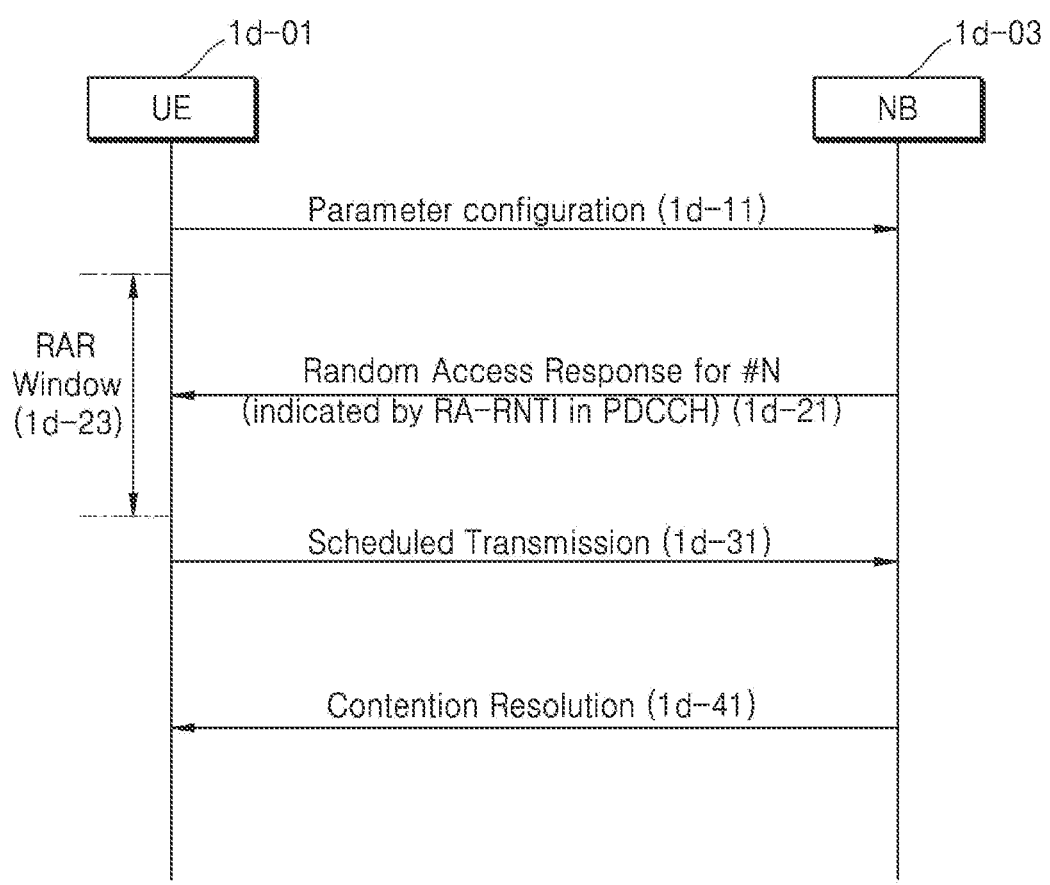
FIG. 1D is a diagram for describing procedures of a user equipment (UE) performing contention-based random access on a node B (NB) according to an embodiment of the disclosure.

FIG. 1D is a diagram for describing procedures of a UE performing contention-based random access on an NB according to an embodiment of the disclosure.

The contention-based random access may be performed in various cases where initial access, re-access, handover, or other random access is required.

Referring to FIG. 1D, a UE 1d-01 may transmit a random access preamble through a physical channel for random access, for access to an NB 1d-03 in operation 1d-11. Here, the physical channel for random access is referred to as a physical random access channel (PRACH), and one or more UEs 1d-01 may simultaneously transmit random access preambles via a corresponding PRACH resource. The PRACH resource may span one sub-frame, or only some symbols in one sub-frame may be used. Information about the PRACH resource may be included in system information broadcast by the NB 1d-03, such that the UE 1d-01 determines via which time frequency resource the random access preamble is to be transmitted. The random access preamble is a specific sequence specially designed to be receivable even before being completely synchronized with the NB 1d-03 and a plurality of preamble indices may be present depending on the standards. When a plurality of preamble indices are present, the random access preamble transmitted by the UE 1d-01 may be randomly selected by the UE 1d-01, or may be a specific preamble designated by the NB 1d-03.

When the random access preamble is received, the NB 1d-03 transmits a random access response (RAR) message to the UE 1d-01 in operation 1d-21. The RAR message may be transmitted in a RAR window 1d-23. The RAR message may include at least one of index information of the random access preamble used in operation 1d-11, UL transmission timing correction information, UL resource assignment information to be used in a subsequent operation (i.e., 1d-31), or temporary UE identity information. The index information of the random access preamble may be transmitted, for example, to identify which preamble the RAR message responded to when a plurality of UEs transmitted different preambles to attempt random access in operation 1d-11. The UL resource assignment information is detailed information about a resource to be used by the UE 1d-01 in operation 1d-31, and may include a physical location and size of the resource, a modulation and coding scheme to be used for transmission, transmission power adjustment information, etc. The temporary UE identity information is a value transmitted because, when the UE 1d-01 having transmitted the random access preamble initially accesses the NB 1d-03, the UE 1d-01 does not have an identity assigned by the NB 1d-03 for communication with the NB 1d-03.

The RAR message needs to be transmitted within a certain period after a certain time from when the random access preamble is transmitted, and the certain period is called the RAR window. The RAR window is started after a certain time when the first random access preamble is transmitted. The certain time may be equal to or smaller than a sub-frame unit (1 ms). Also, the length of RAR window may be a certain value set by the NB 1d-03 for each PRACH resource or for one or more PRACH resource sets within a system information message broadcast by the NB 1d-03.

When the RAR message is transmitted, the NB 1d-03 schedules the RAR message through a PDCCH and corresponding scheduling information may be scrambled using a random access-radio network temporary identifier (RA-RNTI). When the RA-RNTI is mapped to a PRACH resource used to transmit the random access preamble in operation 1d-11, the UE 1d-01 having transmitted the random access preamble by using a specific PRACH resource determines whether the RAR message is received, by attempting PDCCH reception based on the corresponding RA-RNTI. That is, when the RAR message is a response to the random access preamble transmitted by the UE 1d-01 in operation 1d-11 as in FIG. 1D, the RA-RNTI used in RAR message scheduling information may include information about the transmission of operation 1d-11. In this regard, the RA-RNTI may be calculated via the following Equation (1):

$$RA\text{-}RNTI = 1 + s\_id + 14 \times t\_id + 14 \times 80 \times f\_id + 14 \times 80 \times 8 \times ul\_carrier\_id \quad \text{(Equation 1)}$$

Here, s_id denotes an index corresponding to the first OFDM symbol where transmission of the random access preamble transmitted in operation 1d-11 is started, and may have a value of $0 \leq s\_id < 14$ (i.e., the maximum OFDM number in one slot). Also, t_id denotes an index corresponding to the first slot where transmission of the random access preamble transmitted in operation 1d-11 is started, and may have a value of $0 \leq t\_id < 80$ (i.e., the maximum slot number in one system frame (10 ms)). Also, f_id denotes information regarding a PRACH resource, on a frequency, in which the random access preamble, transmitted in operation 1d-11, is transmitted and may have a value of $0 \leq f\_id < 8$ (i.e., the maximum PRACH number on a frequency within a same time). Also, ul_carrier_id is a factor for distinguishing, when two carriers are used in UL for one cell, whether a normal UL (NUL) transmitted the random access preamble (in this case, 0) or a supplementary UL (SUL) transmitted the random access preamble (in this case, 1).

The UE 1d-01 having received the RAR message transmits a message according to the above-described various purposes by using the resource assigned to the RAR message at operation 1d-31. Such a message is a message transmitted third in FIG. 1D, and may be called Msg3 (that is, the random access preamble of operation 1d-11 or 1d-13 may be called Msg1 and the RAR message of operation 1d-21 may be called Msg2). For example, the Msg3 transmitted by the UE 1d-01 may include a RRCConnectionRequest message that is an RRC entity message, for initial access, include a RRCConnectionReestablishmentRequest message for re-access, or include a RRCConnectionReconfigurationComplete message for handover. Alternatively, a buffer status report (BSR) message for requesting a resource may be transmitted.

When the Msg3 is initially transmitted (for example, when the Msg3 does not include NB identity information previously assigned for the UE 1d-01), the UE 1d-01 may receive a contention resolution message from the NB 1d-03 at operation 1d-41. The contention resolution message includes the entirety of the information included in the Msg3 transmitted by the UE 1d-01 and thus the UE 1d-01 to receive the contention resolution message may be identified even when a plurality of UEs select the same random access preamble in operation 1d-11 or 1d-13.

Figure 1E:
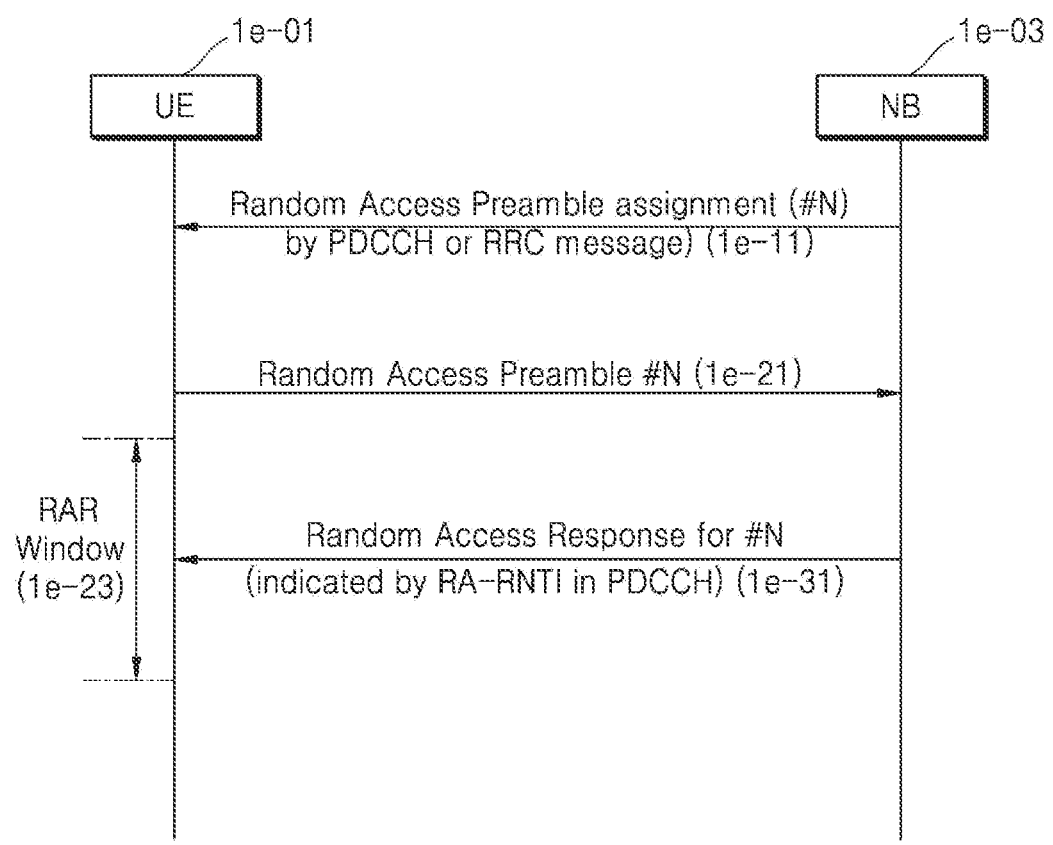
FIG. 1E is a diagram for describing procedures of a UE performing non-contention-based random access on an NB according to an embodiment of the disclosure.

FIG. 1E is a diagram for describing procedures of a UE performing non-contention-based random access on an NB according to an embodiment of the disclosure.

Referring to FIG. 1E, a UE 1e-01 may perform the non-contention-based random access when an NB 1e-03 assigns a specific random access resource (a specific preamble index and/or a PRACH resource on a specific time/frequency) to the UE 1e-01 when UL timing alignment is required or during handover.

The NB 1e-03 may assign an exclusive random access resource to the UE 1e-01 at operation 1e-11 such that the UE 1e-01 performs the non-contention-based random access. Here, the exclusive random access resource may be the specific preamble index and/or the PRACH resource on the specific time/frequency. Also, information about the exclusive random access may be assigned via PDCCH or transmitted via a message of an RRC entity. The message of the RRC entity may include an RRCReconfiguration message.

Accordingly, the UE 1e-01 may transmit a random access preamble via the assigned exclusive random access resource at operation 1e-21.

Upon receiving the random access preamble, the NB 1e-03 may transmit an RAR message to the UE 1e-01 at operation 1e-31. The RAR message may include at least one of index information of the random access preamble used in operation 1e-21, UL transmission timing correction information, UL resource assignment information to be used in a subsequent operation, or temporary UE identity information. The index information of the random access preamble may be transmitted, for example, to identify which preamble the RAR message responded to when a plurality of UEs transmitted different preambles to attempt random access in operation 1e-11. The UL resource assignment information is detailed information about a resource to be used by the UE 1e-01 after receiving the RAR message, although not illustrated in FIG. 1E, a UL may be transmitted via a corresponding resource after the RAR message is received. The temporary UE identity information is a value transmitted because, when the UE 1e-01 having transmitted the random access preamble initially accesses the NB 1e-03, the UE 1e-01 does not have an identity assigned by the NB 1e-03 for communication with the NB 1e-03.

The RAR message needs to be transmitted within a certain period after a certain time from when the random access preamble is transmitted, and the certain period is called a RAR window 1e-23. The RAR window may be started after a certain time when the first random access preamble is transmitted. The certain time may be equal to or smaller than a sub-frame unit (1 ms). Also, the length of RAR window may be a certain value set by the NB 1e-03 for each PRACH resource or for one or more PRACH resource sets within a system information message broadcast by the NB 1e-03.

When the RAR message is transmitted, the NB 1e-03 schedules the RAR message through a PDCCH and corresponding scheduling information may be scrambled using an RA-RNTI. When the RA-RNTI is mapped to a PRACH resource used to transmit the random access preamble in operation 1e-11, the UE 1e-01 having transmitted the random access preamble by using a specific PRACH resource may determine whether the RAR message is received, by attempting PDCCH reception based on the corresponding RA-RNTI. That is, when the RAR message is a response to the random access preamble transmitted by the UE 1e-01 in operation 1e-11 as in FIG. 1E, the RA-RNTI used in RAR message scheduling information may include information about the transmission of operation 1e-11. In this regard, the RA-RNTI may be calculated via the following Equation (2):

$$\text{RA-RNTI} = 1 + s\_id + 14 \times t\_id + 14 \times 80 \times f\_id + 14 \times 80 \times 8 \times ul\_carrier\_id \quad \text{(Equation 2)}$$

Here, s_id denotes an index corresponding to the first OFDM symbol where transmission of the random access preamble transmitted in operation 1e-11 is started, and may have a value of $0 \leq s\_id < 14$ (i.e., the maximum OFDM number in one slot). Also, t_id denotes an index corresponding to the first slot where transmission of the random access preamble transmitted in operation 1e-11 is started, and may have a value of $0 \leq t\_id < 80$ (i.e., the maximum slot number in one system frame (10 ms)). Also, f_id denotes to which PRACH resource the random access preamble was transmitted in operation 1e-11 on a frequency, and may have a value of $0 \leq f\_id < 8$ (i.e., the maximum PRACH number on a frequency within a same time). Also, ul_carrier_id is a factor for distinguishing, when two carriers are used in UL for one cell, whether an NUL transmitted the random access preamble (in this case, 0) or an SUL transmitted the random access preamble (in this case, 1).

The UE 1e-01 having performed the non-contention-based random access may determine that the non-contention-based random access is successful when the RAR message corresponding to the transmitted random access preamble is received. The UE 1e-01 may transmit a message to a UL assigned via the RAR message.

Figure 1F:
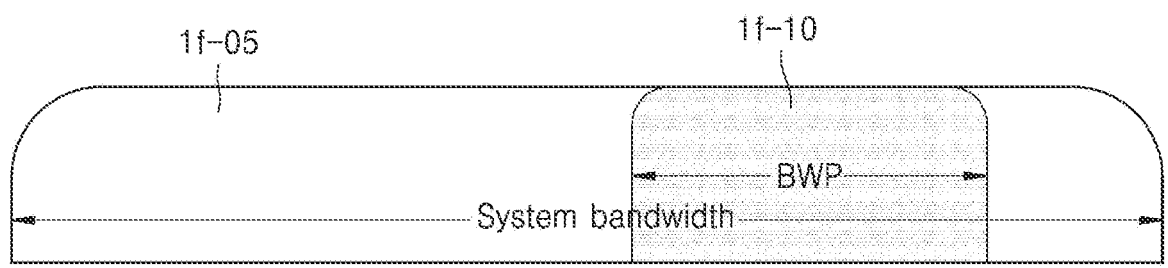
FIGS. 1FA, 1FB and 1FC are diagrams for describing scenarios of applying a partial frequency band in a wireless communication system according to an embodiment of the disclosure.
Figure 1F:
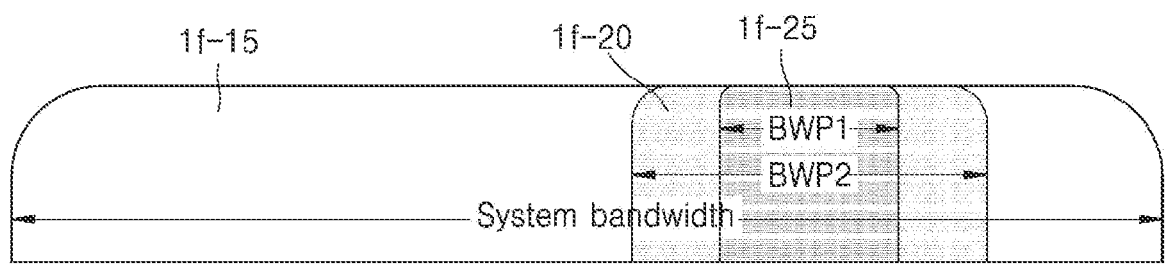
Figure 1F:
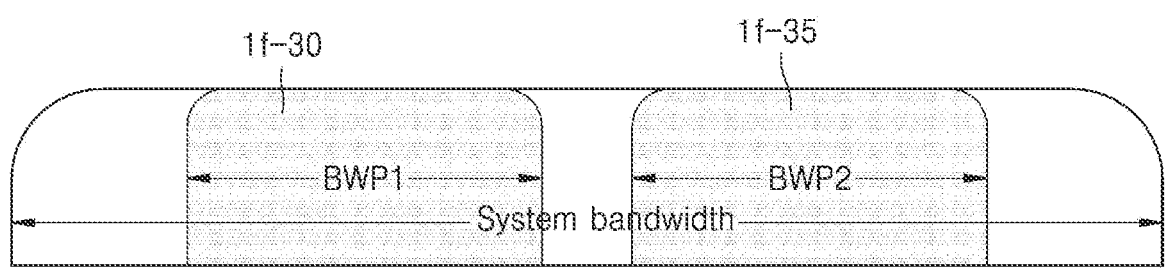

FIGS. 1FA, 1FB and 1FC are diagrams for describing scenarios of applying a partial frequency band in a wireless communication system according to an embodiment of the disclosure.

A partial frequency band (bandwidth part (BWP)) application technology indicates that a UE performs communication by only using a BWP among system bandwidths used by one cell. BWP may be used for UE manufacturing cost reduction or UE power saving. The BWP may be set by a base station only for a UE supporting the BWP.

Referring to FIGS. 1FA to 1FC, there may be largely three types of BWP operating scenarios.

Referring to FIG. 1FA, a first scenario is to configure a BWP for the UE supporting only a small BWP 1f-10 that is less than a system bandwidth 1f-05 used by a cell. To reduce manufacturing costs, a specific UE may be developed to support only a limited bandwidth. This UE needs to report to the base station that only a limited bandwidth is supported, and thus the base station may configure a BWP equal to or less than the maximum bandwidth supported by the UE.

Referring to FIG. 1FB, a second scenario is to configure a BWP for UE power saving. For example, although the UE may perform communication by using a whole system bandwidth 1f-15 used by a cell or by using a BWP2 1f-20 thereof, the base station may configure a smaller BWP1 1f-25 for power saving.

Referring to FIG. 1FC, a third scenario is to configure individual BWPs corresponding to different numerologies. Numerologies are used to diversify physical entity configurations for optimal data transmission based on various service requirements. For example, in an orthogonal frequency-division multiple access (OFDMA) structure including a plurality of subcarriers, subcarrier spacing may be variably adjusted based on a certain requirement. The UE may perform communication by simultaneously using multiple numerologies. In this case, because physical entity configurations corresponding to the numerologies differ, individual BWPs 1f-30 and 1f-35 may be configured to correspond to different numerologies.

There may be a plurality of BWPs for each of DL and UL within one serving cell. Accordingly, when the UE performs the above-described random access and a random access preamble is transmitted via a UL BWP, it may be ambiguous as to through which DL BWP an RAR response is to be received by the UE when there are multiple DL BWPs. In order to remove such ambiguity, a linkage between the DL BWP and the UL BWP may be defined. For example, when the UE transmitted a preamble to a UL BWP no. 3 of one serving cell (for example, a PCell) within the serving cell, the ambiguity may disappear when an RAR response is received via a DL BWP no. 3 of the serving cell. However, when the UE performs random access via an SCell in the above-described CA circumstance, a preamble may be transmitted via the SCell and an RAR response may be received via a PCell. In such a circumstance, the random access is successfully performed only when a DL BWP of a PCell of the UE for receiving the RAR response is defined.

Figure 1G:
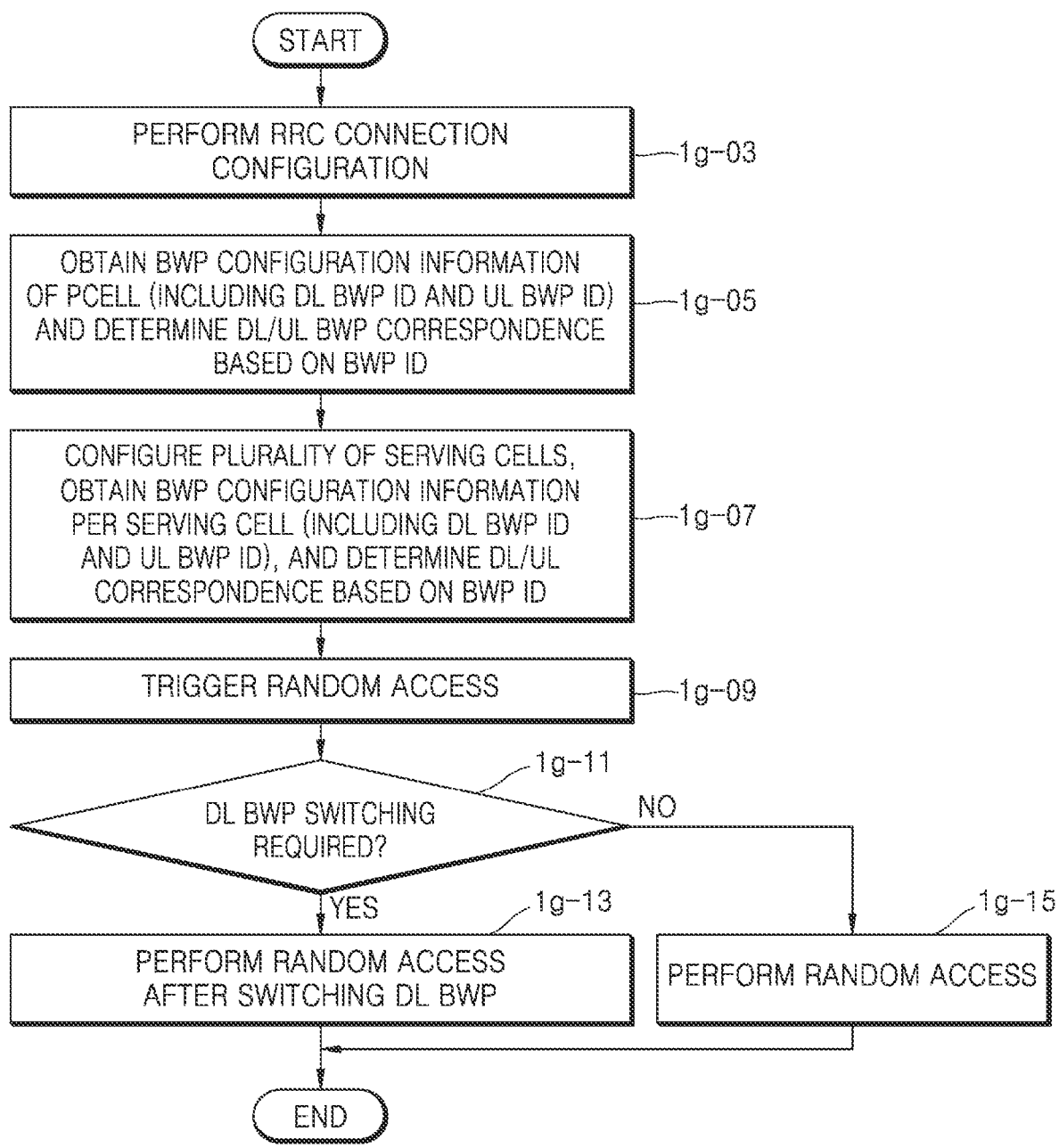
FIG. 1G is a diagram for describing operations of a UE according to an embodiment of the disclosure.

FIG. 1G is a diagram for describing operations of a UE according to an embodiment of the disclosure.

Referring to FIG. 1G, when the UE is in an idle mode, the UE may perform random access according to information broadcast by a base station to transmit an RRC connection request message and receive an RRC connection configuration message, thereby performing RRC connection configuration at operation 1g-03.

Through the RRC connection configuration message or through a subsequent additional RRC message (for example, an RRCReconfiguration message), the UE may obtain BWP configuration information of a PCell (including DL DWP ID and UL BWP ID) at operation 1g-05. Accordingly, as described above, the UE may determine a DL/UL BWP linkage or correspondence based on the BWP ID, or directly receive the linkage/mapping information of the DL BWP ID and the UL BWP ID through a signaling message.

The UE may additionally configure a plurality of SCells for a CA function from the base station at operation 1g-07. Here, the UE may obtain the BWP configuration information (including the DL BWP ID and the UL BWP ID) per serving cell. As described above, the DL/UL BWP linkage may be determined based on the BWP ID or the linkage/mapping information of the DL BWP ID and the UL BWP ID may be directly received via the signaling message. Here, according to types of methods described below, the UE may additionally determine or be directly signaled a DL BWP ID of a PCell with respect to a corresponding UL BWP ID. For example, when a UL BWP ID of an SCell no. 1 is no. 3, a DL BWP ID of a corresponding PCell may be mapped to no. 3 (indirect mapping). As another example, the base station may directly map the DL BWP ID of the PCell with respect to the UL BWP ID no. 3 of the SCell no. 1 to no. 3 or to another BWP ID (direct mapping). When the indirect mapping is used, the number of UL BWP IDs of the SCell may be greater than the number of DL BWP IDs of the PCell, and in this case, when random access is performed via a UL BWP ID having the greater value than the maximum DL BWP ID of the PCell, the DL BWP ID of the corresponding PCell may have a certain value. The certain value may be set to 0, set to the maximum DL BWP ID of the PCell, or directly set via a message of an RRC entity by the base station.

The UE may perform the contention-based random access or non-contention-based random access described with reference to FIG. 1D or 1E on the PCell or SCell at operation 1g-09.

Here, the UE may determine whether to switch (change) the DL BWP by using one of the following three methods, but embodiments are not limited thereto.

Method 1: When the UE performs contention-based random access, the UE performs BWP switching when a DL BWP ID of a serving cell (PCell or SCell) on which the contention-based random access is performed, which is mapped to a UL BWP ID of the serving cell, is different from a current DL BWP ID of the serving Cell, and when the UE performs non-contention-based random access, the UE does not perform the BWP switching even when the DL BWP ID of the serving cell performing the non-contention-based random access, which is mapped to the UL BWP ID of the serving cell, is different from a current DL BWP ID of the serving Cell.

Method 2: When the UE performs random access on a PCell, the UE may switch a DL BWP ID of a current PCell to a DL BWP ID of a PCell mapped to a UL BWP ID of the PCell on which the random access is performed when the DL BWP ID of the current PCell is different from the DL BWP ID of the PCell mapped to the UL BWP ID of the PCell on which the random access is performed. However, when the UE performs the random access on an SCell, the UE does not perform the BWP switching even when a DL BWP ID of a PCell or SCell mapped to a UL BWP ID of the SCell on which the random access is performed is different from a current DL BWP ID.

Method 3: When the UE performs random access on a PCell or SCell, the UE may switch a DL BWP ID of a current PCell to a DL BWP ID of a PCell mapped to a UL BWP ID of a serving cell (PCell or SCell) on which the random access is performed when the DL BWP ID of the current PCell is different from the DL BWP ID of the PCell mapped to the UL BWP ID of the serving cell on which the random access is performed.

When the UE determines that DL BWP is required to be switched during the random access at operation 1g-11 according to one of the methods, the UE may perform the random access after the DL BWP switching of the serving cell at operation 1g-13. When it is determined that the DL BWP is not required to be switched, the UE may perform the random access in a currently activated BWP at operation 1g-15.

Details about the PCell described above may be identically applicable to a primary secondary cell group (SCG) cell that functions as a PCell in a secondary NB in addition to a main NB in case of a dual connection in which one UE is simultaneously connected to and uses two NBs. Also, the PCell and the SpCell are collectively called a special cell (SpCell), and details about the PCell may also be applied to the SpCell.

Figure 2A:
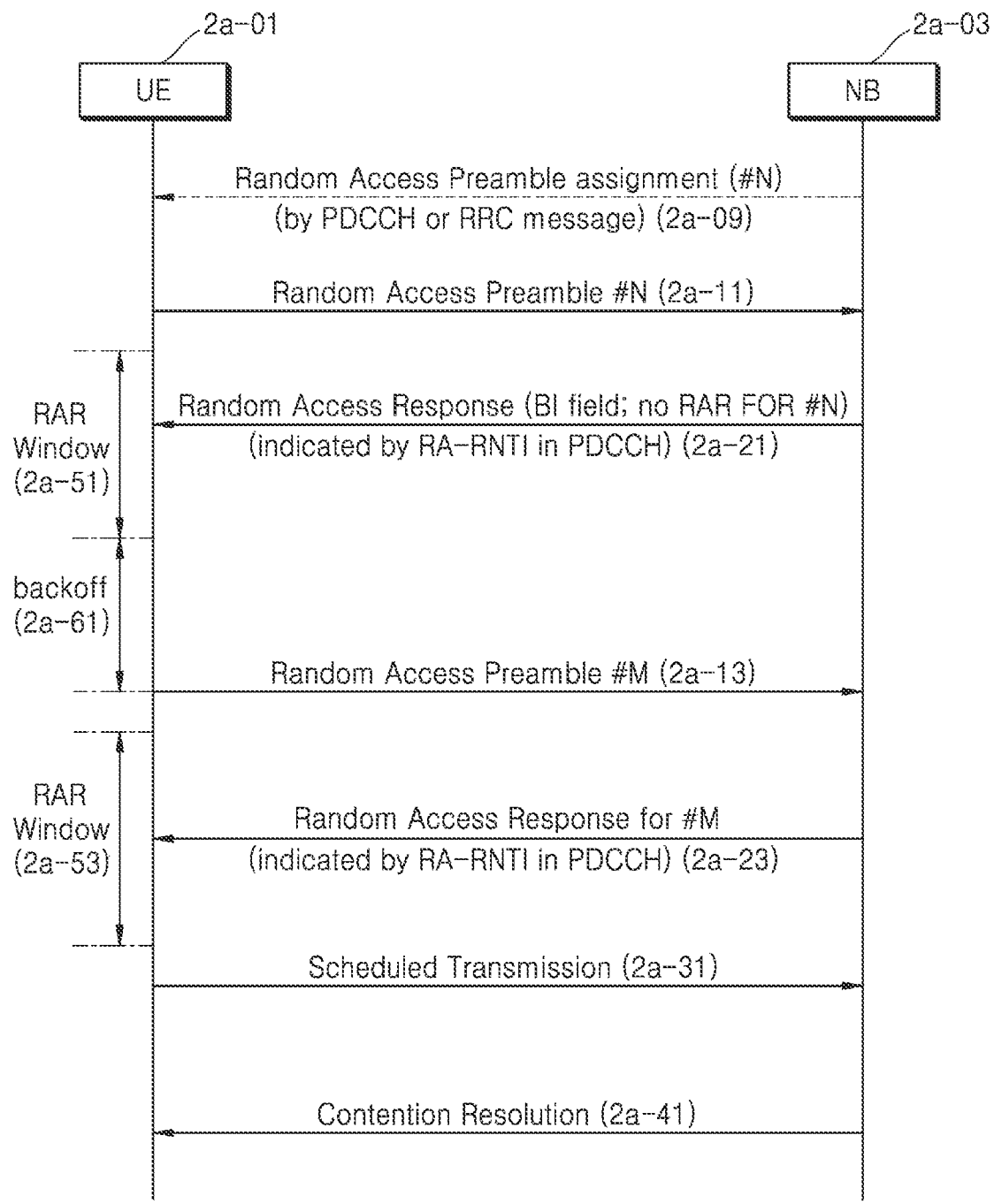
FIG. 2A is a diagram for describing procedures of a UE performing contention-based random access and non-contention-based random access on an NB according to an embodiment of the disclosure.

FIG. 2A is a diagram for describing procedures of a UE performing contention-based random access and non-contention-based random access on an NB according to an embodiment of the disclosure.

Random access may be performed in various cases where initial access, re-access, handover, or other random access is required.

Referring to FIG. 2A, in the current embodiment of the disclosure, procedures of the contention-based random access are mainly described. In procedures of the non-contention-based random access, a procedure of assigning an exclusive random access resource may be present before the non-contention-based random access such that a NB 2a-03 performs the non-contention-based random access on a UE 2a-01 at operation 2a-09. The exclusive random access resource may be a specific preamble index and/or a PRACH resource on a specific time/frequency. Also, information about the exclusive random access may be assigned via PDCCH or transmitted via a message of an RRC entity. The message of the RRC entity may include an RRCReconfiguration message. Accordingly, when there is the exclusive random access resource assigned from the NB 2a-03 with respect to the non-contention-based random access currently performed, the UE 2a-01 may transmit a random access preamble via the exclusive random access resource. Also, during the non-contention-based random access, when there is a preamble transmitted by the UE 2a-01 in an RAR message described below, it is determined that the non-contention-based random access has been successfully performed and the procedures of the non-contention-based random access may be ended.

Hereinafter, the procedures of the contention-based random access will be described.

The UE 2a-01 may transmit a random access preamble through a physical channel for random access, for access to the NB 2a-03 at operation 2a-11. Here, the physical channel for random access is referred to as a PRACH, and one or more UEs 2a-01 may simultaneously transmit random access preambles via a corresponding PRACH resource. The PRACH resource may span one sub-frame, or only some symbols in one sub-frame may be used. Information about the PRACH resource may be included in system information broadcast by the NB 2a-03, such that the UE 2a-01 determines via which time frequency resource the random access preamble is to be transmitted. The random access preamble is a specific sequence specially designed to be receivable even before being completely synchronized with the NB 2a-03 and a plurality of preamble indices may be present depending on the standards. When a plurality of preamble indices are present, the random access preamble transmitted by the UE 2a-01 may be randomly selected by the UE 2a-01, or may be a specific preamble designated by the NB 2a-03.

When the random access preamble (or a preamble transmitted by other UE) is received, the NB 2a-03 transmits a RAR message to the UE 2a-01 at operation 2a-21. The RAR message may include at least one of index information of the random access preamble used in operation 2a-11, UL transmission timing correction information, UL resource assignment information to be used in a subsequent operation (i.e., operation 2a-31), or temporary UE identity information. The index information of the random access preamble may be transmitted, for example, to identify which preamble the RAR message responded to when a plurality of UEs transmitted different preambles to attempt random access in operation 2a-11. The UL resource assignment information is detailed information about a resource to be used by the UE 2a-01 in operation 2a-31, and may include a physical location and size of the resource, a modulation and coding scheme to be used for transmission, transmission power adjustment information, etc. The temporary UE identity information is a value transmitted because, when the UE 2a-01 having transmitted the random access preamble initially accesses the NB 2a-03, the UE 2a-01 does not have an identity assigned by the NB 2a-03 for communication with the NB 2a-03.

Also, when it is determined that there are too many UEs 2a-01 performing the contention-based random access, based on a received energy amount of PRACH or because the number of random access preambles received through the PRACH for a certain time is determined to be equal to or greater than a certain number, the UE 2a-01 may receive a sub-header including information of a backoff indicator in the RAR message. The sub-header is provided at the very beginning of the RAR message. The backoff indicator has a size of 4 bits and has a value as shown in Table 1 below.

TABLE 1

Backoff Indicator

| Index | Backoff parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

When the UE 2a-01 receives only the information of the backoff indicator and does not receive a response to the contention-based preamble within a period of a 'RAR window' described below, the UE 2a-01 may select a random number between 0 and a value received when the contention-based preamble is retransmitted and delay a preamble retransmission time by the selected random number during backoff of 2a-61.

The RAR message needs to be transmitted within a certain period after a certain time from when the random access preamble is transmitted, and the certain period is called a RAR window 2a-51 or 2a-53. The RAR window is started after a certain time when the first random access preamble is transmitted. The certain time may be equal to or smaller than a sub-frame unit (2 ms). Also, the length of RAR window may be a certain value set by the NB 2a-03 for each PRACH resource or for one or more PRACH resource sets within a system information message broadcast by the NB 2a-03.

When the RAR message is transmitted, the NB 2a-03 schedules the RAR message through a PDCCH and corresponding scheduling information may be scrambled using an RA-RNTI. When the RA-RNTI is mapped to a PRACH resource used to transmit the random access preamble in operation 2a-11, the UE 2a-01 having transmitted the random access preamble by using a specific PRACH resource determines whether the RAR message is received, by attempting PDCCH reception based on the corresponding RA-RNTI. That is, when the RAR message is a response to the random access preamble transmitted by the UE 2a-01 in operation 2a-11 as in FIG. 2A, the RA-RNTI used in RAR message scheduling information may include information about the transmission of operation 2a-11. In this regard, the RA-RNTI may be calculated via the following Equation (3):

$$\text{RA-RNTI}=1+s\_id+14\times t\_id+14\times 80\times f\_id+14\times 80\times 8\times ul\_carrier\_id \quad \text{(Equation 3)}$$

Here, s_id denotes an index corresponding to the first OFDM symbol where transmission of the random access preamble transmitted in operation 2a-11 is started, and may have a value of 0≤s_id<14 (i.e., the maximum OFDM number in one slot). Also, t_id denotes an index corresponding to the first slot where transmission of the random access preamble transmitted in operation 2a-11 is started, and may have a value of 0≤t_id<80 (i.e., the maximum slot number in one system frame (20 ms)). Also, f_id denotes which PRACH resource the random access preamble transmitted in operation 2a-11 is transmitted on a frequency, and may have a value of $0 \leq f\_id < 8$ (i.e., the maximum PRACH number on a frequency within a same time). Also, ul_carrier_id is a factor for distinguishing, when two carriers are used in UL for one cell, whether an NUL transmitted the random access preamble (in this case, 0) or an SUL transmitted the random access preamble (in this case, 1).

In the current embodiment of the disclosure, a scenario in which the UE 2a-01 received the RAR message via the RA-RNTI corresponding to the transmitted random access preamble at operation 2a-11, but an index corresponding to the random access preamble is not included is assumed. That is, for example, the UE 2a-01 may have transmitted a preamble index no. 7 among total 64 preamble indices, but an RAR message received from the NB 2a-03 may include a response only to a preamble index no. 4. Accordingly, when there is a backoff indicator (BI) value received when the random access preamble is retransmitted as described above, the UE 2a-01 may delay the retransmission time by the selected random number from the BI value during backoff of 2a-61, retransmit the random access preamble at operation 2a-13, stand by for a response in the RAR window 2a-53, and receive the RAR message at operation 2a-23. As such, when there are many UEs 2a-01 performing the contention-based random access, preamble transmission is distributed in time and thus random access success probability is increased.

In addition, when the random access preamble is retransmitted at operation 2a-13, the UE 2a-01 may transmit the random access preamble with power (power ramping) obtained by increasing transmission power of transmitting a preamble according to a value (preamblePowerRampingStep) received from the NB 2a-03 compared to a transmission power of the random access preamble transmitted in operation 2a-11. Accordingly, the power is continuously increased until the power reaches the maximum transmission power of the UE 2a-01 as the retransmission number is increased, and thus a possibility of a signal reaching the NB 2a-03 is further increased.

The UE 2a-01 having received the RAR message transmits another message according to the above-described various purposes by using the resource assigned to the RAR message at operation 2a-31. In the current embodiment of the disclosure, a message transmitted third is called Msg3 (that is, the random access preamble of operation 2a-11 or 2a-13 is called Msg1 and the RAR message of operation 2a-21 is called Msg2). For example, the Msg3 transmitted by the UE 2a-01 may include a RRCConnectionRequest message that is an RRC entity message, for initial access, include a RRCConnectionReestablishmentRequest message for re-access, or include a RRCConnectionReconfiguration-Complete message for handover. Alternatively, a BSR message for requesting a resource may be transmitted.

When the Msg3 is initially transmitted (for example, when the Msg3 does not include NB identity information previously assigned for the UE 2a-01), the UE 2a-01 may receive a contention resolution message from the NB 2a-03 at operation 2a-41. The contention resolution message includes the entirety of the information included in the Msg3 transmitted by the UE 2a-01 and thus the UE 2a-01 to receive the contention resolution message may be identified even when a plurality of UEs select the same random access preamble in operations 2a-11 or 2a-13.

Reasons for performing random access for each UE may vary. As described above, the reasons may include initial access (including initial access for high priority traffic), handover, reconfiguration due to RRC entity connection failure, etc., and in addition, the random access may be used when beam failure is recovered from, wherein the beam failure occurs when transmission fails due to inconsistency of a direction of a beam and a direction of a UE in a system using a high frequency. Accordingly, the random access may need to be performed fast during handover or restoration of beam failure so as to reduce user inconvenience because the handover or beam failure indicates a case where communication of the UE is disconnected.

Accordingly, when the UE performs random access to perform handover or recover from beam failure, values of the backoff indicator and power ramping described above may be different from those during general random access. For example, for such purposes, the backoff indicator may use a shorter value and the power ramping may use a greater value to increase a success time and probability of the random access. As such, a parameter for providing high priority is called a high priority access (HPA) parameter.

Also, when the beam failure is recovered from, the UE may perform a recovery operation not only on a PCell, but also on an SCell, and accordingly, the HPA parameter may be commonly signaled to and applied to all serving cells. Other general random access parameters (the size of RAR window, the size of power ramping, and the maximum preamble transmission time described above) may be separately configured by a base station for each serving cell.

Figure 2B:
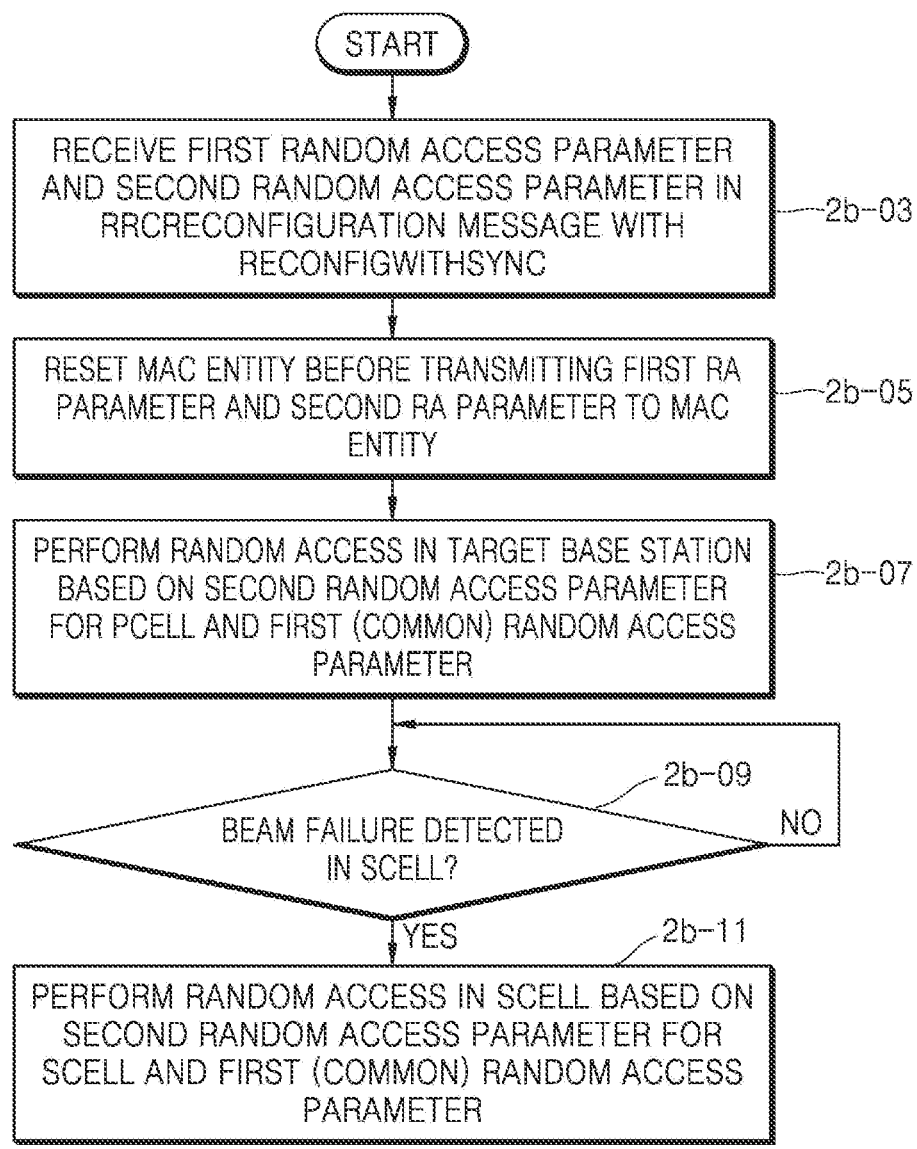
FIG. 2B is a diagram for describing operations of a UE according to a first embodiment of the disclosure.

FIG. 2B is a diagram for describing operations of a UE according to a first embodiment of the disclosure.

Referring to FIG. 2B, in the current embodiment of the disclosure, it is assumed that the UE is already connected to and communicates with a base station in a connection mode, and a scenario in which handover to another base station (or another cell in the same base station) is performed according to movement of the UE is assumed.

Accordingly, the UE may receive a handover command from a source base station at operation 2b-03. The UE may receive a command to move to the corresponding base station when information element (IE) of ReconfigwithSync is included in an RRCReconfiguration message of an RRC entity. Also, the RRCReconfiguration message may include a first random access parameter and a second random access parameter.

The first random access parameter is a set of parameters related to the HPA parameter described above, which are applied to all serving cells. For example, the first random access parameter may include BackoffScalingFactorHighPriorityAccess related to a backoff indicator and preamblePowerRampingStepHighPriorityAccess related to power ramping. The BackoffScalingFactorHighPriorityAccess is a value indicating how much to scale a value signaled to an existing backoff indicator when applying time, such as ½, ¼, or 0 compared to a signaled backoff time. For example, when the UE performs random access for handover and beam failure recovery while the signaled backoff time is 10 ms and BackoffScalingFactorHighPriorityAccess is ½, the UE may delay the random access by selecting a random value between 0 and 5 ms (10 ms×½) during preamble retransmission, and then perform the random access. Also, according to preamblePowerRampingStepHighPriorityAccess, when random access of high priority is performed, the UE may increase transmission power by preamblePowerRampingStepHighPriorityAccess instead of preamblePowerRampingStep that is a value of increasing transmission power during general random access.

Also, the second random access parameter denotes all configurations for performing general random access, includes the size of RAR window, preamblePowerRampingStep, the maximum preamble transmission number, etc., and is a value set for each serving cell during CA configuration. Accordingly, the UE may perform random access by applying a value configured for each serving cell while performing random access for each serving cell.

Upon receiving a handover command, the UE may reset a MAC entity before attempting an access to a target base station at operation 2b-05. Here, when first random access parameter and/or the second random access parameter configured by the existing source base station are present, the first and/or second random access parameters are deleted from the MAC entity via a MAC reset operation, and then the RRC entity may transmit the first random access parameter and the second random access parameter configured via the handover command to the MAC entity.

The UE may perform synchronization with the target base station and perform the random access on the target base station at operation 2b-07. Here, the UE may perform the random access by using the first random access parameter and the second random access parameter received from the handover command of the RRC entity in operation 2b-07. The MAC entity of the UE is unable to determine whether the RRC entity of the UE is performing handover. Accordingly, the MAC entity assumes that the first random access after the MAC entity is reset is random access for handover. Accordingly, when the UE performs the first random access parameter after the MAC entity is reset and there is the first random access parameter configured from the target base station, the MAC entity of the UE determines that the first random access is an operation for handover and may perform backoff and power ramping operations by applying the configured first random access parameter when preamble retransmission is required. Here, the first random access parameter is a parameter commonly applied throughout serving cells. Also, at this time, the UE may perform the first random access by applying the second random access parameter for a PCell in addition to the first random access parameter.

Also, according to an additional embodiment of the disclosure, when CA is set after the handover is successful, the UE may have to perform an operation of recovering from a beam failure as the beam failure occurs in an SCell set to CA when the SCell operates in a high frequency at operation 2b-09. In this case, the UE may perform the backoff and power ramping operations by applying the pre-configured first random access parameter commonly applied throughout the serving cells, and perform the random access by applying the second random access parameter for the SCell currently performing the random access in addition to the first random access parameter at operation 2b-11.

Accordingly, the UE may quickly succeed in random access when random access preamble retransmission is performed according to purposes of performing the random access.

Figure 2C:
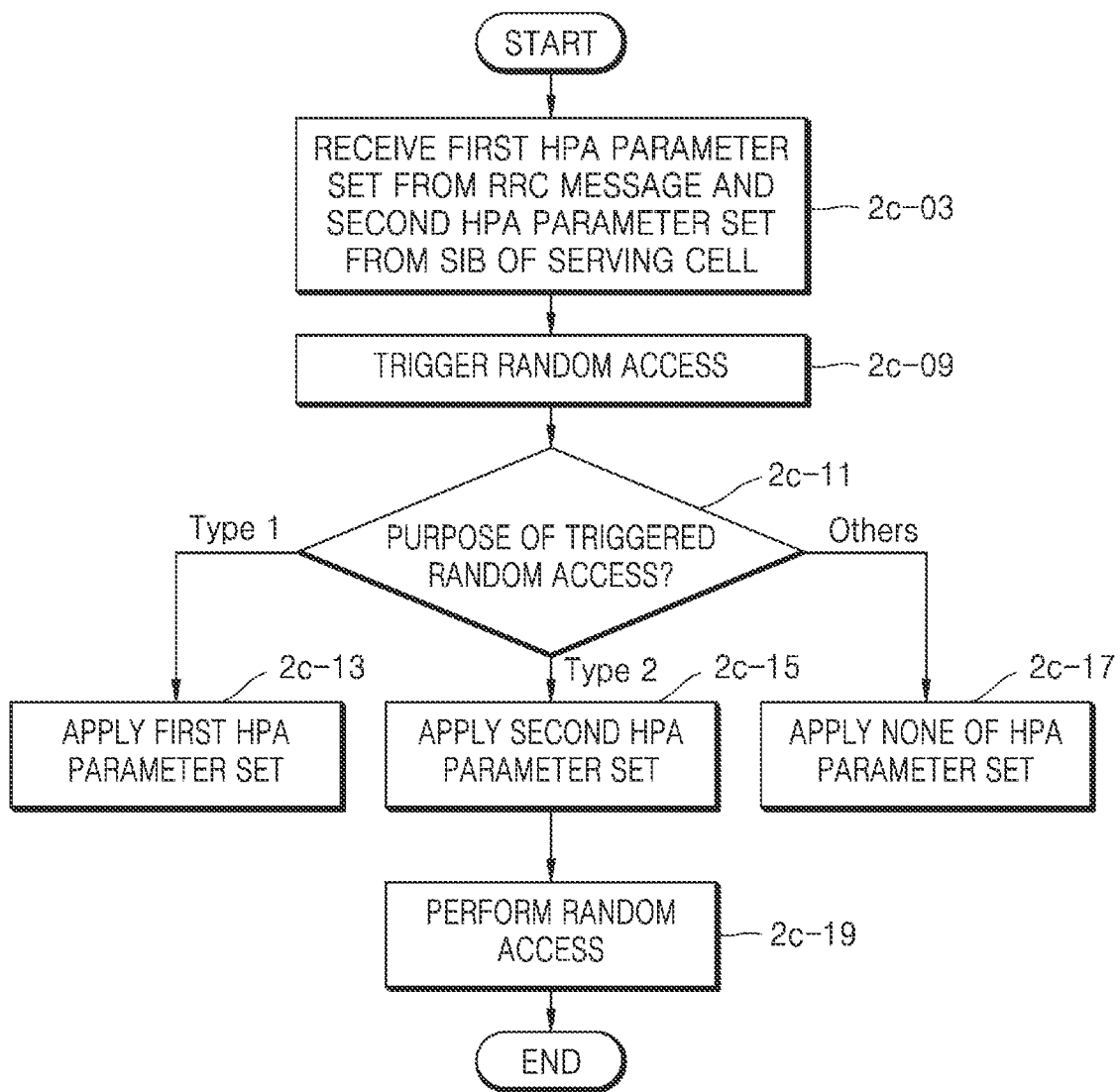
FIG. 2C is a diagram for describing operations of a UE according to a second embodiment of the disclosure.

FIG. 2C is a diagram for describing operations of a UE according to a second embodiment of the disclosure.

Referring to FIG. 2C, in the current embodiment of the disclosure, the UE assumes to be in a status of RRC connection. Accordingly, the UE may receive a first random access parameter from a base station via an RRCReconfiguration message of an RRC entity at operation 2c-03. For example, the UE may receive a first HPA parameter set from the RRC message. In addition, the UE may receive a 1-1$^{st}$ random access parameter that is another set of HPA parameters via the RRCReconfiguration message or SystemInformationBlock (SIB) message of the RRC entity. The SIB message is a message broadcast by the base station to the UE in a cell. Also, as described with reference to FIG. 2B, the UE may receive configuration for each serving cell set via the SIB message or RRCReconfiguration message with respect to a second random access parameter. For example, the UE may receive a second HPA parameter set from the SIB message.

When random access is triggered in the UE at operation 2c-09, the UE may apply different HPA parameters based on purposes at operation 2c-11.

When the UE performs random access for handover or beam failure recovery as in the example of FIG. 2B (Type 1), the UE may perform the random access at operation 2c-19 by applying the first random access parameter and the second random access parameter for the serving cell at operation 2c-13. Also, even when the UE is unable to receive scheduling from the base station despite a scheduling request is continuously transmitted via a configured PUCCH resource by the maximum transmission number, the UE may perform random access at operation 2c-19 by applying the first random access parameter and the second random access parameter for the serving cell at operation 2c-13.

Also, when the UE performs an RRC connection reestablishment procedure to restore a connection with a PCell, the UE may perform random access at operation 2c-19 by applying a 1-1$^{st}$ random access parameter and the second random access parameter for the PCell at operation 2c-15.

When random access is performed for other purposes (for example, when random access is triggered via PDCCH transmission from the base station or when random access is triggered for UL transmission having low priority), the UE may perform random access at operation 2c-19 by applying only the second random access parameter for the serving cell performing random access at operation 2c-17, without applying the first random access parameter or the 1-1$^{st}$ random access parameter.

Figure 2D:
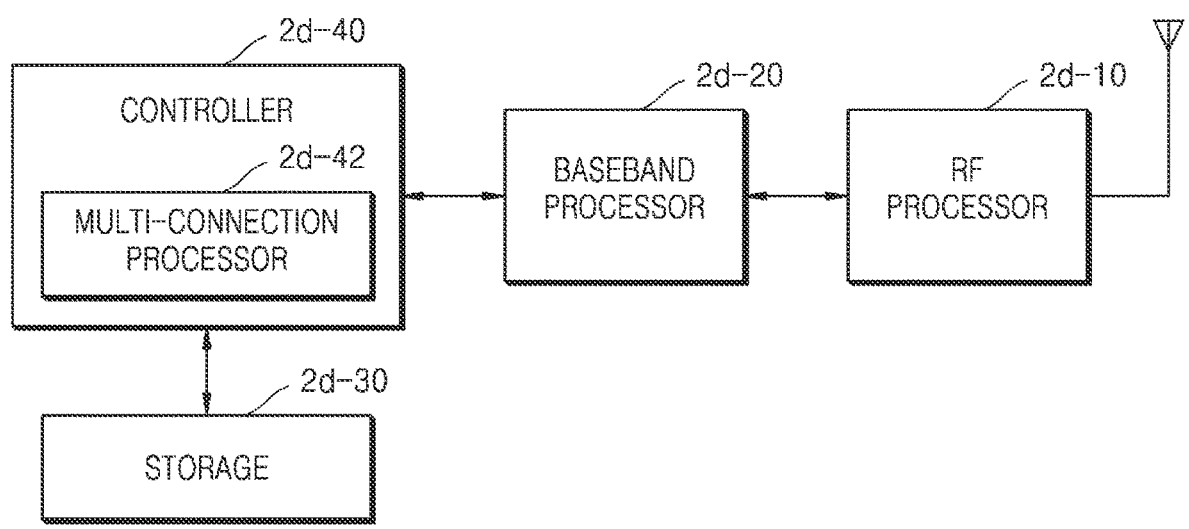
FIG. 2D is a block diagram of a UE according to an embodiment of the disclosure.

FIG. 2D is a block diagram of a UE according to an embodiment of the disclosure.

Referring to FIG. 2D, the UE includes a radio frequency (RF) processor 2d-10, a baseband processor 2d-20, a storage 2d-30, and a controller 2d-40. However, the components of the UE are only examples, and thus the UE may include more or less components than those of FIG. 2D.

The RF processor 2d-10 may perform functions for transmitting and receiving signals through radio channels, e.g., signal band conversion and amplification. That is, the RF processor 2d-10 may up-convert a baseband signal provided from the baseband processor 2d-20, to a RF band signal and transmit the RF band signal through an antenna, and down-convert a RF band signal received through an antenna, to a baseband signal. For example, the RF processor 2d-10 may include a transmit filter, a receive filter, an amplifier, a mixer, an oscillator, a digital-to-analog convertor (DAC), and an analog-to-digital convertor (ADC). Although only a single antenna is illustrated in FIG. 2D, the UE may include multiple antennas. The RF processor 2d-10 may include multiple RF chains. The RF processor 2d-10 may perform beamforming. For beamforming, the RF processor 2d-10 may adjust phases and amplitudes of signals transmitted or received through multiple antennas or antenna elements. The RF processor 2d-10 may perform multiple input multiple output (MIMO) and may receive data of multiple layers in the MIMO operation.

The baseband processor 2d-20 may convert between a baseband signal and a bitstream based on physical entity specifications of a system. For example, for data transmission, the baseband processor 2d-20 may generate complex symbols by encoding and modulating a transmit bitstream. For data reception, the baseband processor 2d-20 may reconstruct a received bitstream by demodulating and decoding a baseband signal provided from the RF processor 2d-10. For example, according to an orthogonal frequency-division multiplexing (OFDM) scheme, for data transmission, the baseband processor 2d-20 may generate complex symbols by encoding and modulating a transmit bitstream, map the complex symbols to subcarriers, and then configure OFDM symbols by performing inverse fast Fourier transformation (IFFT) and cyclic prefix (CP) insertion. For data reception, the baseband processor 2d-20 may segment a baseband signal provided from the RF processor 2d-10, in OFDM symbol units, reconstruct signals mapped to subcarriers by performing fast Fourier transformation (FFT), and then reconstruct a received bitstream by demodulating and decoding the signals.

The baseband processor 2d-20 and the RF processor 2d-10 may transmit and receive signals as described above. As such, each of the baseband processor 2d-20 and the RF processor 2d-10 may also be called a transmitter, a receiver, a transceiver, or a communication unit. At least one of the baseband processor 2d-20 or the RF processor 2d-10 may include multiple communication modules to support multiple different radio access technologies. At least one of the baseband processor 2d-20 or the RF processor 2d-10 may include multiple communication modules to process signals of different frequency bands. For example, the different radio access technologies may include a wireless local area network (wireless LAN) (e.g., IEEE 802.11) and a cellular network (e.g., LTE). The different frequency bands may include a super-high frequency (SHF) (e.g., 2.5 GHz and 5 GHz) band and a millimeter wave (mmWave) (e.g., 60 GHz) band.

The storage 2d-30 may store data for operation of the UE, e.g., basic programs, application programs, and configuration information. In particular, the storage 2d-30 may store information about a wireless LAN node for performing wireless communication by using a wireless LAN access technology. The storage 2d-30 may provide the stored data upon request by the controller 2d-40.

The controller 2d-40 may control overall operations of the UE. For example, the controller 2d-40 may transmit and receive signals through the baseband processor 2d-20 and the RF processor 2d-10. The controller 2d-40 may record and read data on or from the storage 2d-30. In this regard, the controller 2d-40 may include at least one processor. For example, the controller 2d-40 may include a communication processor (CP) for controlling communications and an application processor (AP) for controlling an upper entity such as an application program. According to an embodiment of the disclosure, the controller 2d-40 may include a multi-connection processor 2d-42 for operation in a multi-connection mode. For example, the controller 2d-40 may control the UE to perform procedures show in FIG. 2B.

The controller 2d-40 according to an embodiment of the disclosure may perform random access by applying a parameter according to the type of random access performed by the UE.

According to one or more embodiments of the disclosure, a UE is able to receive a random access response in a correct bandwidth while performing random access and thus, the random access may be successfully performed with a base station. Also, according to one or more embodiments of the disclosure, the UE may perform random access in a graded manner while retrying the random access according to a type of the random access.

The methods according to the embodiments of the disclosure described in the claims or the detailed description may be implemented in hardware, software, or a combination of hardware and software.

When the methods are implemented in software, a non-transitory computer-readable recording medium having one or more programs (software modules) recorded thereon may be provided. The one or more programs recorded on the non-transitory computer-readable recording medium are configured to be executable by one or more processors in a device. The one or more programs include instructions to execute the methods according to the embodiments of the disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may include a plurality of the above and other memory devices.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the disclosure. Another storage device on the communication network may also be connected to the apparatus performing the embodiments of the disclosure.

In the afore-described embodiments of the disclosure, elements included in the disclosure are expressed in a singular or plural form according to the disclosed embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method, performed by a terminal, for a random access in a wireless communication system, the method comprising:
   receiving, from a base station, bandwidth part (BWP) configuration information including an identity (ID) of each of at least one downlink (DL) BWP and at least one uplink (UL) BWP for each of at least one serving cell; and
   performing a random access procedure on an active UL BWP of a serving cell based on the BWP configuration information, wherein performing of the random access procedure comprises:
   based on the serving cell being a special cell and an ID of an active DL BWP of the serving cell being is not same as an ID of the active UL BWP of the serving cell:
      switching the active DL BWP of the serving cell to a DL BWP of the serving cell with an ID same as the ID of the active UL BWP of the serving cell, and
      performing the random access procedure on the switched DL BWP of the serving cell and the active UL BWP of the serving cell, and
   based on the serving cell being a secondary cell (SCell):
      performing the random access procedure on an active DL BWP of the special cell and the active UL BWP of the serving cell, and
wherein the special cell is a primary cell (Pcell), or a primary secondary cell group cell.

2. The method of claim 1, wherein the ID of the DL BWP is same as the ID of the active UL BWP, in case that the ID of the DL BWP is mapped to the ID of the active UL BWP.

3. The method of claim 1, wherein the ID of the active DL BWP is not same as the ID of the active UL BWP, in case that the ID of the active DL BWP is not mapped to the ID of the active UL BWP.

4. The method of claim 1, wherein the random access procedure includes a contention-based random access procedure and a contention-free random access procedure.

5. A method, performed by a base station, for a random access in a wireless communication system, the method comprising:
   transmitting, to a terminal, bandwidth part (BWP) configuration information including an identity (ID) of each of at least one downlink (DL) BWP and at least one uplink (UL) BWP for each of at least one serving cell;
   based on a serving cell being a special cell and an ID of an active DL BWP of the serving cell being not same as an ID of an active UL BWP of the serving cell, performing a random access procedure with the terminal on the active UL BWP of the serving cell and a DL BWP of the serving cell switched from the active DL BWP of the serving cell, wherein the switched DL BWP has an ID same as the ID of the active UL BWP of the serving cell; and
   based on the serving cell being a secondary cell (Scell), performing the random access procedure with the terminal on an active DL BWP of the special Cell and the active UL BWP of the serving cell,
wherein the special cell is a primary cell (Pcell) or a primary secondary cell group cell.

6. The method of claim 5, wherein the random access procedure includes a contention-based random access procedure and a contention-free random access procedure.

7. The method of claim 5, wherein the ID of the DL BWP is same as the ID of the active UL BWP, in case that the ID of the DL BWP is mapped to the ID of the active UL BWP.

8. The method of claim 5, wherein the ID of the active DL BWP is not same as the ID of the active UL BWP, in case that the ID of the active DL BWP is not mapped to the ID of the active UL BWP.

9. A terminal for performing a random access in a wireless communication system, the terminal comprising:
   a transceiver; and
   at least one processor coupled with the transceiver and configured to:
   receive, from a base station, bandwidth part (BWP) configuration information including an identity (ID) of each of at least one downlink (DL) BWP and at least one uplink (UL) BWP for each of at least one serving cell, and
   perform a random access procedure on an active UL BWP of a serving cell based on the BWP configuration information,
wherein performing of the random access procedure comprises:
   based on the serving cell being a special cell and an ID of an active DL BWP of the serving cell is being not same as an ID of the active UL BWP of the serving cell,
      switching the active DL BWP of the serving cell to a DL BWP of the serving cell with an ID same as the ID of the active UL BWP of the serving cell, and
      performing the random access procedure on the switched DL BWP of the serving cell and the active UL BWP of the serving cell; and
   based on the serving cell being a secondary cell (Scell), performing the random access procedure on an active DL BWP of the special cell and the active UL BWP of the serving cell, and
wherein the special cell is a primary cell (Pcell), or a primary secondary cell group cell.

10. The terminal of claim 9, wherein the ID of the DL BWP is same as the ID of the active UL BWP, in case that the ID of the DL BWP is mapped to the ID of the active UL BWP.

11. The terminal of claim 9, wherein the ID of the active DL BWP is not same as the ID of the active UL BWP, in case that the ID of the active DL BWP is not mapped to the ID of the active UL BWP.

12. The terminal of claim 9, wherein the random access procedure includes a contention-based random access procedure and a contention-free random access procedure.

13. A base station for performing a random access in a wireless communication system, the base station comprising:
   a transceiver; and
   at least one processor coupled with the transceiver and configured to:
   transmit, to a terminal, bandwidth part (BWP) configuration information including an identity (ID) of each of at least one downlink (DL) BWP and at least one uplink (UL) BWP for each of at least one serving cell,
   based on a serving cell being a special cell and an ID of an active DL BWP of the serving cell is not same as an ID of an active UL BWP of the serving cell, perform a random access procedure with the terminal on the active UL BWP of the serving cell and a DL BWP of the serving cell switched from the active DL BWP of the serving cell, wherein the switched DL BWP has an ID same as the ID of the active UL BWP of the serving cell, and
   based on the serving cell being a secondary cell, Scell, perform the random access procedure with the terminal on an active DL BWP of the special Cell and the active UL BWP of the serving cell,
wherein the special cell is a primary cell, Pcell, or a primary secondary cell group cell.

14. The base station of claim 13, wherein the random access procedure includes a contention-based random access procedure and a contention-free random access procedure.

15. The base station of claim 13, wherein the ID of the DL BWP is same as the ID of the active UL BWP, in case that the ID of the DL BWP is mapped to the ID of the active UL BWP.

16. The base station of claim 13, wherein the ID of the active DL BWP is not same as the ID of the active UL BWP, in case that the ID of the active DL BWP is not mapped to the ID of the active UL BWP.

* * * * *